United States Patent [19]

Mengeringhausen

[11] 3,841,781
[45] Oct. 15, 1974

[54] APPARATUS FOR THE PRODUCTION OF CONNECTORS FOR SPACE FRAMEWORKS OR THE LIKE

[75] Inventor: Max Mengeringhausen, Wurzburg, Germany

[73] Assignee: Mero AG, Zug, Switzerland

[22] Filed: Feb. 6, 1974

[21] Appl. No.: 440,184

Related U.S. Application Data

[62] Division of Ser. No. 222,111, Jan. 31, 1972.

[30] Foreign Application Priority Data

Feb. 8, 1971  Germany............................ 2105824

[52] U.S. Cl..................... 408/35, 408/117, 269/51, 279/5
[51] Int. Cl............................................. B23b 39/20
[58] Field of Search .......... 408/71, 79, DIG. 1, 117, 408/31, 35; 10/128; 269/47, 48, 51; 279/5

[56] References Cited
UNITED STATES PATENTS

2,269,946   1/1942   Lange ............................ 408/DIG. 1
3,243,094   3/1966   Lucas.................................. 269/51

*Primary Examiner*—Francis S. Husar
*Attorney, Agent, or Firm*—Brady, O'Boyle & Gates

[57] ABSTRACT

In producing spherical and polyhedral connectors for space frameworks from blanks a tapped through hole is first formed through the center of the blank. The blank is then engaged by its through hole in a clamping device that is rotatable along the axis of the through hole, the clamping device being mounted on an element that is rotatable on an axis at right angles to the axis of the through hole and which intersects the axis of the through hole at right angles. Tool mean positioned adjacent the clamp to work on the blank engaged thereby operate along an axis disposed perpendicular to the first two mentioned axes, the tool means being operative to machine the blank at fixed spatial positions to which the blank is adjusted by movement about the first two axes, the tool means boring holes in the blank, machining flats around said holes at right angles to the holes and tapping the holes. Between these machining operations the tool means are moved relative to the clamping device and the connector blank about a further axis common to the tool means and the clamping device. The connector blank is then positioned to a new predetermined spatial position by the clamping device and the tool means produce another hole while the blank is maintained in the original clamping device by its through hole whereby a plurality of accurate spaced holes are produced in the connector blank.

4 Claims, 12 Drawing Figures

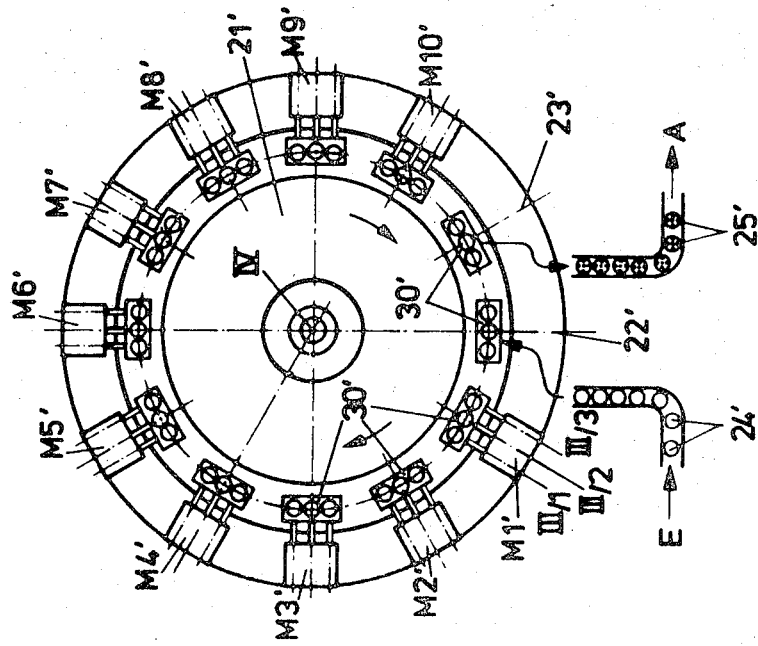
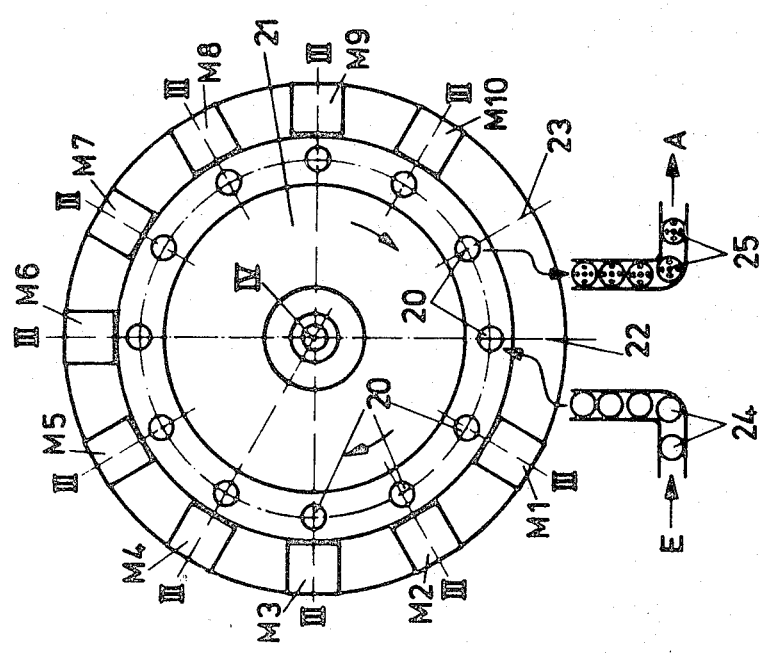

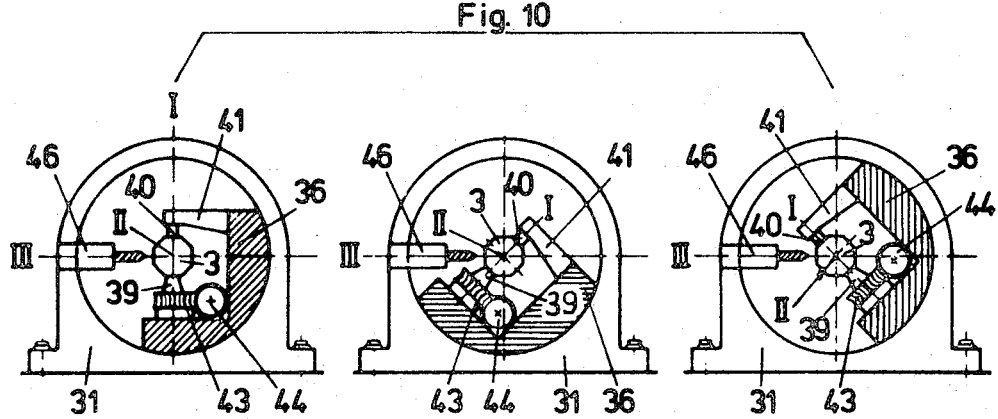
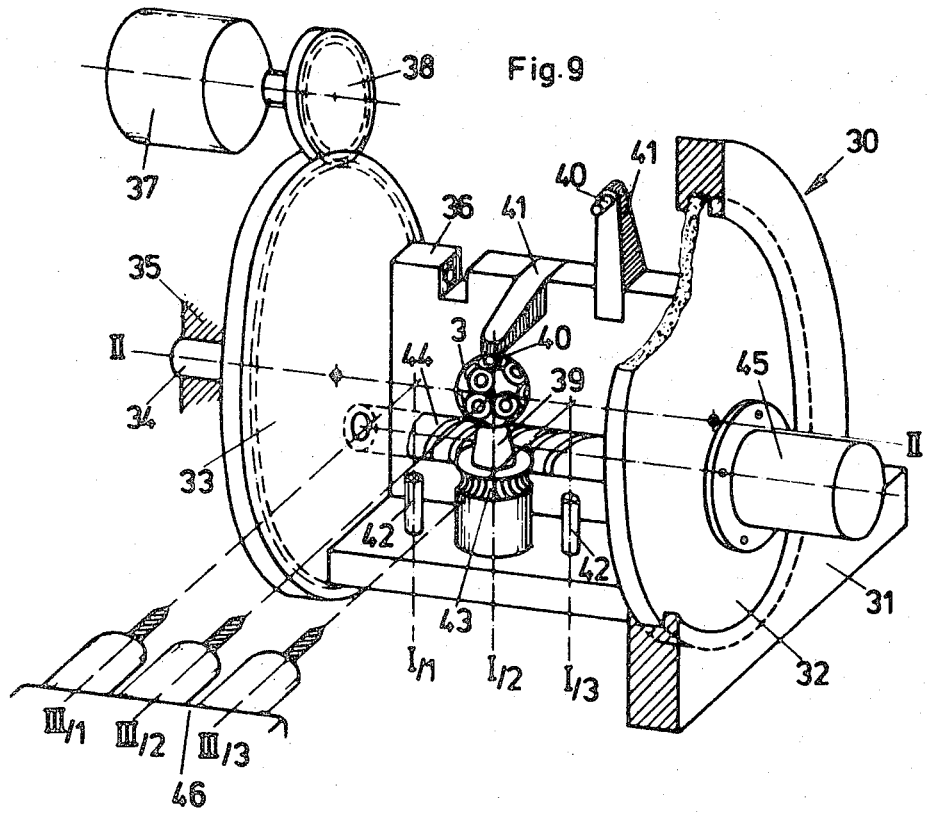

APPARATUS FOR THE PRODUCTION OF CONNECTORS FOR SPACE FRAMEWORKS OR THE LIKE

This is a division, of application Ser. No. 222,111 filed 1/31/72.

This invention relates to a process and apparatus for the production of connectors for space frameworks or the like, particularly polyhedral connectors, wherein a connector blank is held in a clamping device and provided with tapped holes, the axes of which intersect in the center of the connector.

These connectors are spherical or polyhedral bodies of a superstrength material which are provided with a number of concentric threaded holes of extreme accuracy for the threaded connection of rods and other structural elements for the manufacture of space frameworks. Space frameworks of different space configurations and static relationships, in turn, require connectors of a great variety of types. Therefore, one differentiates between so-called "standard connectors" with a certain number of equally large tapped connecting bores which form regular angles, as well as "special connectors" wherein the angles between the individual threaded connecting holes are different and the threaded connecting holes can vary in diameter with respect to one another, namely from one threaded hole to the next.

In any event, the extremely high stresses to which such connectors can be exposed in space frameworks require that the tapped connecting bores be machined with extreme position, especially since already the smallest dimensional discrepancies in correspondingly voluminous space framework constructions can result in a cumulative effect with extremely disadvantageous consequences of various kinds.

The manufacturing method customary heretofore consists in providing, for each type of connectors, several operating steps in series and in changing, between the operating steps, not only the cutting tools but also the clamping devices for the connector blanks, i.e., the connector blank is in each case repeatedly clamped into position for individual partial working steps. In this manner, for example, standard connectors with 18 tapped connecting holes are manufactured by dimensionally milling, in a first operating step, the necessary surfaces at a spherical connector blank; conducting the necessary drilling operations in a second operating step; and tapping the holes in a third operating step. For producing the bores for the connecting threads, it is conventional to clamp the connectors into boring jigs radially surrounding the connector blank, whereby an even more cumbersome mode of operation, for example by marking out, spotting, and center drilling the individual polyhedral surfaces of the connector blank is avoided. However, this operating method is uneconomical in many respects, for it requires not only a repeated clamping of the connector blank at separate work stations, but also necessitates tool sets separately associated to the respective work stations, which must be operated by various personnel if a somewhat continuous manufacture is to be attained at all. Furthermore, each type of connector with different angles and dimensions of the tapped connecting bores requires a separate boring jig and a corresponding tool set. Another disadvantageous consequence of this conventional mode of operation is that it makes the use of modern numerical control techniques for the operating process practically impossible, which is primarily due to the entirely separated working steps at different work stations, the repeated renewed clamping, and the type of clamping devices and boring jigs employed heretofore for the connector blanks.

The invention is based on the problem of rendering the manufacture of connectors of various types more economical for the purposes set forth hereinabove and making it possible to effect a continuous, time-saving performance of the numerous operating steps without a time-consuming multiple clamping operation at a single device with optimum coordination of the working steps, so that also numerical controllers can be used for regulating the operating sequence.

In accordance with the invention, this problem is solved by a process characterized by the following process steps:

a. formation of a through hole, preferably a tapped hole, extending at least through the approximate center of the connector blank, and truncating or countersinking of the connector blank at the bore openings at right angles to the axis of the through hole in order to accurately limit the length of the latter;

b. clamping the connector blank in this through hole axis by means of a clamping device which is rotatable about two axes, in such a manner that the two axes intersect with a further axis of a tool in the center of the connector blank under a variable angular ratio;

c. adjustment of the connector blank in various spatial positions by rotation about the two axes, and machining the blank in fixed spatial positions along the further axis of a tool; and d. effecting a relative motion between the clamping device and the tools about a fourth axis common to the tools and the clamping device, in order to machine the connector blank by means of various tools along the further axis, while maintaining the original clamping of the blank in the axis of the through hole.

This process has the advantage that, with a single clamping of the connector blank in its through hole axis, all of the required operating steps to manufacture connectors of a great variety of types can be continuously conducted on one and the same apparatus by a single operator. Since the clamping condition of the connector blank is not changed between the individual processing steps, and the connector blank can be placed into any desired spatial positions and fixed therein for machining, an automatic, for example numerical control of the operating steps is also advantageously possible. The machining of the connector blank has been so much simplified by the process of the present invention that the necessary operating steps can be effected even in case of connectors of up to 26 tapped connecting bores within a relatively short period of time. In an automation of the manufacturing procedure, a single operator can monitor and operate simultaneously several work stations or devices. Another advantage of the process of this invention resides in that, avoiding separate special boring jigs, connectors can be produced, the threaded connecting holes of which can exhibit very different angles and diameters with respect to one another. This can be of decisive economical importance for space framework projects wherein numerous different connectors are required which, however, constitute only a small number of items per manufacturing series. This is true, in particular, for space framework domes and similar constructions. Especially in these dome constructions, it has been necessary heretofore to manufacture the connectors individually and to utilize for this purpose a relatively high expenditure in working hours of highly qualified personnel. Process step (a) can be executed by conventional means. Process step (b) ensures, on the one hand, that the axes of all tapped connecting bores intersect in the center of the connector and makes it possible, on the other hand, in conjunction with process step (c) to form varying angles between the individual threaded connecting bores. In other words, the connectors are placed into a great variety of different spatial positions while maintaining a single clamping for providing the tapped connecting bores. Thereby, the economical manufacture of not only the so-called standard connectors but also of the special connectors has been ensured. Finally, process step (d) makes it possible, inter alia, to produce economically, for example, different threaded connecting bores at one and the same work station in a continuous operating sequence. Furthermore, it is possible to produce, in place of respectively one threaded connecting bore, in a fixed spatial position of the connector blank, simultaneously several mutually parallel threaded connecting bores.

A further embodiment of the process of this invention resides in that several connector blanks are clamped into a clamping device at a lateral spacing from one another in their through hole axes in such a manner that their axes intersect the axis of rotation of the clamping device, and that the connector blanks are adjusted into the various spatial positions alternatingly by the common rotation of the connector blanks about the axes of their through holes and about the axis of rotation of the clamping device commonly associated with the connector blanks, and the connector blanks are simultaneously machined in the fixed spatial positions along the axes of several tools. Thereby, the advantage is attained that several connector blanks can be processed together in different fixed spatial positions simultaneously by several tools. This further increases the economy of the connector production. At the same time, the advantage is obtained that the angles between the individual threaded connecting bores can be of individual character and different, and that also the thread diameters at the same connector can vary from one tapped hole to the other. Furthermore, this mode of operation makes it possible to use multiple-spindle machining units for the simultaneous provision of numerous threaded connecting holes at the various connector blanks.

In accordance with a further feature of this invention, the length termination of the individual tapped holes can be derived from the length termination of the through hole by truncating or countersinking of the connector blank. This derivation of the length termination can be effected in a mechanical, electrical, or opticoelectrical manner, wherein the feed of the tools along the tool axes is automatically limited in such a manner that all of the tapped connecting holes of the finished connector exhibit the same length.

According to the present invention, the apparatus for conducting the manufacturing process for connectors is characterized by a bearing block on which is mounted a head with a circular base to be rotatable about an axis, exhibiting two arms diametrically disposed at the circular base and projecting therefrom in a vertical or almost vertical direction, the clamping device for the connector blank, which device is rotatable about its axis, being supported in these arms in such a manner that the two axes of rotation of the clamping device intersect in a point with the further axis of a tool, which latter axis is preferably oriented perpendicularly to one of the axes of rotation of the clamping device. This apparatus is structurally simple and makes it possible, with a single clamping of the connector blank in the axis of its through hole, to effect the required adjustment of the connector blank into the various spatial positions for executing the required machining operations.

Another apparatus for conducting the process of this invention is characterized in that the clamping device for the connector blank, which is adjustable about its axis of rotation, is provided with its axis of rotation on a diameter of a ring, the internal diameter of which is larger than the outer diameter of a connector blank, this ring being suspended to be rotatable about a further axis of rotation intersecting with one of the axes of rotation of the clamping device and with the further axis of a tool in one point, wherein the tool axis is preferably disposed perpendicularly on one of the axes of rotation of the clamping device. This apparatus is likewise distinguished by structural simplicity and universal usability for the production of connectors of a great variety of types (so-called standard connectors and special connectors).

In accordance with another feature of the invention, a system of tools associated with the clamping device is provided, with an axis of rotation about which the tools are adjustable in such a manner that their axes intersect alternatingly the axes of rotation of the clamping device in a point, the axes of the tools being disposed in parallel to the axis of rotation of the tool system. This ensures the time-saving utilization of the required tools for the production of each truncated or countersunk area and each tapped connecting bore in the various fixed spatial positions of the connector blank.

The clamping device can also be arranged to be rotatably movable about a system of fixed tools disposed along a circular path, the center of which is congruent with the axis of rotation of the clamping device.

In accordance with another feature of this invention, several clamping devices can be mounted at spacings from one another in an annular arrangement on an indexing table which rotates intermittently about an axis, and in the spacing of the clamping devices, a plurality of machining units can be fixedly disposed in an annular arrangement on the periphery of the indexing table, the tool axes of these machining units intersecting the axis of rotation of the indexing table. Thereby, a particularly economical mass production of connectors can be achieved, wherein the plant can be numerically controlled and the entire working time of, for example, a so-called standard connector, can be reduced to a few minutes. The great reduction in the machining time per connector is due to the fact that the machining units around the indexing table are employed simultaneously, with the table being at a standstill. The number of units depends essentially on the required milling and drilling operations and/or on the number of different-size threaded connecting bores. With the aid of the numerical control, the indexing table, the machining units, and the individual clamping devices can be operated in synchronism.

According to another feature of the invention, the axes of the tools can form a right angle with the axis of rotation of the indexing table. This permits a radial arrangement of the machining units on the periphery of the indexing table.

However, it is also possible to dispose the machining units with the tools fixedly in a circular arrangement above the path of motion of the clamping devices, so that their axes extend in parallel or approximately in parallel with the axis of rotation of the indexing table. This arrangement is preferred if the diameter of the entire apparatus is to be kept as small as possible.

According to a further feature of the invention, several clamping devices for connector blanks can be mounted in series laterally at mutual spacings and rotatable about their axes on a support rotatable about a further axis, wherein the axes of the clamping devices intersect the axis of rotation of the support under a right angle. Also, a common drive can be associated with the clamping devices, and a machining unit can be provided at a spacing of the clamping devices, the tool axes of which intersect the axis of a clamping device and the axis of rotation of the support in each instance in one point. The advantage attained thereby resides in that simultaneously several connector blanks can be adjusted in different spatial positions wherein they are simultaneously machined by one machining unit in a time-saving manner.

A particularly time-saving mass production can be obtained by providing, according to another feature of the present invention, numerous sets of several clamping devices on one indexing table. In the marginal zone of this table, a system of machining units is fixedly mounted, the tool axes of which intersect the axes of rotation of the sets of clamping devices in individual points associated with the clamping devices. Thereby, it becomes possible to operate simultaneously highefficiency machining units with several tool spindles.

The invention will be described in greater detail below with reference to the drawings, showing several embodiments. In the drawings:

FIG. 8 is a schematic top view of a device with an indexing table carrying several clamping devices for connector blanks cooperating with fixed machining units on the periphery of the indexing table;

FIG. 9 is a schematic perspective view of a multiple-way clamping device for connector blanks, wherein several parts have been omitted for the sake of clarity, in conjunction with a schematically indicated machining unit;

Figure 1:
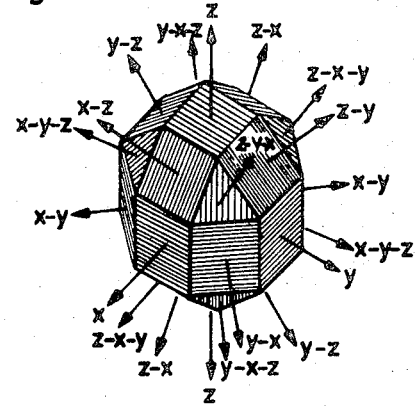
FIG. 1 shows a schematic perspective view of a polyhedral connector blank for 26 tapped connecting bores.

FIG. 10 shows, partially in section and on a reduced scale, three schematic lateral views of the apparatus illustrated in FIG. 9 in its numerous different setting positions; and FIG. 11 is a schematic plan view of an indexing table carrying several sets of multiple-way clamping devices according to FIG. 9 cooperating with corresponding stationary machining units on the periphery of the indexing table.

In FIGS. 1–5, several different connectors are shown, partially in a schematic view, all of which can be manufactured in accordance with the process of this invention with extreme precision in one and the same apparatus in a fully automatic manner. However, it is to be noted that this invention is not limited to these connectors illustrated in the drawings.

FIG. 1 shows schematically a polyhedral connector blank with 26 faces and axes of symmetry, the axes being denoted as customary in crystal science; as a finished connector, this article is suitable for space frameworks in accordance with the system of the body-centered cube as well as in accordance with the system of the face-centered cube.

Figure 2:
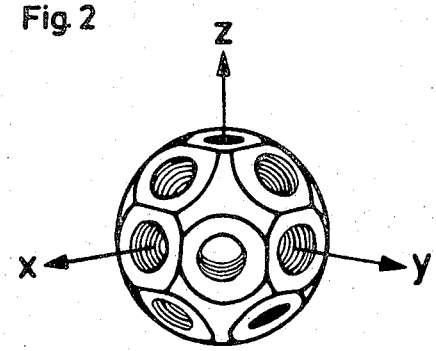
FIG. 2 is a perspective view of a polyhedral (standard) connector with 18 tapped connecting bores.

FIG. 2 illustrates a connector with 18 tapped connecting bores of equal diameter for space frameworks frequently employed in practice, solely in the system of the face-centered cube.

Figure 3:
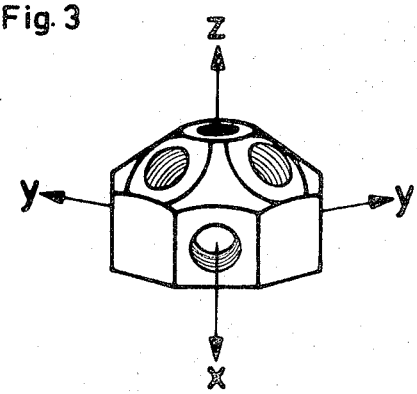
FIG. 3 is a perspective view of a (special) connector with only 8 tapped connecting bores.

In contrast thereto, the connector shown in FIG. 3 is intended exclusively for space frameworks of half octahedrons and tetrahedrons and thus exhibits, in addition to the through hole with the axis Z wherein the clamping is effected, only 8 threaded connecting holes at regular angular spacings.

Figure 4:
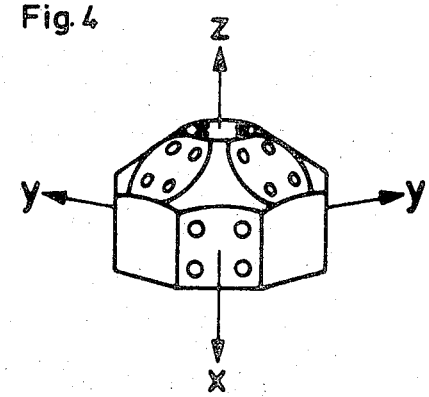
FIG. 4 is a view of a connector similar to FIG. 3, this connector exhibiting respectively four tapped connecting bores on the corresponding junction surfaces.

FIG. 4 shows basically the same structural shape of a connector as illustrated in FIG. 3; however, in each connecting face of the polyhedral connector, four tapped connecting bores for rod connections with a multiple screw joint (not shown) are provided.

Figure 5:
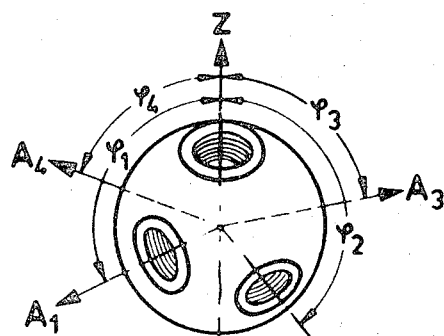
FIG. 5 is a perspective view of another (special) connector with several tapped connecting bores, the axes of which form differing angles.
Figure 5A:
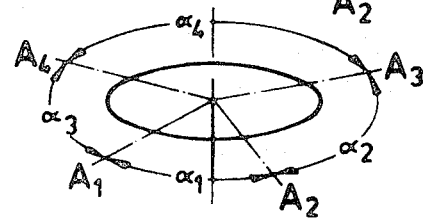
FIG. 5a shows the axial arrangement of the tapped connecting bores, based on FIG. 5 but in one plane for the sake of clarity.

Connectors according to FIG. 5 for use in single-layer geodesic domes possess several tapped connecting bores, four of these being shown in this embodiment, the axes $A_1 - A_4$ of which form different angles $\phi_1 - \phi_4$ with respect to the through hole axis Z (axis of the receiving bore) and different angles $\alpha_1 - \alpha_4$ with one another (see FIG. 5a).

Figure 6:
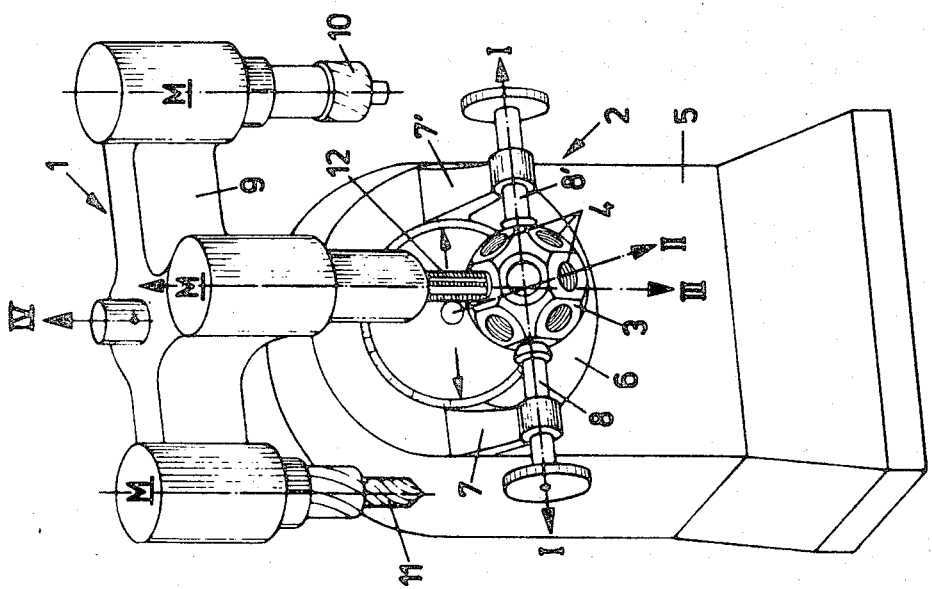
FIG. 6 shows a schematic perspective view of one embodiment of a combined clamping device and machining unit for connectors.

In FIG. 6, a relatively simple combined machining unit 1 and clamping device 2 can be seen, with a polyhedral connector 3 exhibiting 18 tapped connecting bores 4 and corresponding to the connector shown in FIG. 2. The clamping device 2 contains a bearing block 5 at which a head with a circular base 6 is mounted to be rotatable about an axis II. Diametrical and approximately vertically projecting arms 7, 7' are mounted to the circular base 6; the holding elements 8, 8' for the connector blank are, in turn, mounted in these arms so that they are rotatable in the axis I and are axially adjustable. The connector blank is first provided with a through tap hole extending at least through the approximate center thereof and with truncated areas at the bore openings at right angles to the drilling axis I; with the aid of the holding elements 8, 8', the blank is clamped or centered in this axis I in such a manner that its center is congruent with the point of intersection of the axes I, II, and a tool axis III which will be explained hereinbelow. The truncated areas also serve to define the length of the tapped through hole and are provided at equal spacings with respect to the center of the connector blank. In order to adjust the connector blank in the various spatial positions for the purpose of producing the further 16 tapped connecting bores 4, the holding elements 8, 8' and the circular base 6 are correspondingly rotated about their axes I and II, respectively, and fixed in the individual machining positions. For this purpose, the holding elements 8, 8' and the circular base 6 can be operated by conventional drive means, for example in an electrical, mechanical, hydraulic, or pneumatic manner. In the embodiment of FIG. 6, the axes of rotation I and II form a right angle with each other, and the tool axis III is disposed perpendicularly on the axis of rotation II.

The machining of the connector blank clamped into the holding elements 8, 8' takes place, in the fixed spatial positions of the blank, in the following sequence:

1. Production of the drill hole aligned with respect to the center of the connector.
2. Milling of a contact surface disposed vertically with respect to the tool axis III with an exact spacing from the center of the connector blank; and
3. Cutting of the thread.

(In case of bores of a larger diameter, it may be necessary to conduct a preliminary drilling step at a smaller diameter.)

In order to execute these operating steps, the machining unit 1 exhibits a three-armed crosshead 9 rotatable about an axis of rotation IV; a shank face miller 10, a twist drill 11, and a cap 12 are mounted at this crosshead, each having its own electromotive drive M. The arrangement is such that the axis of rotation IV extends in parallel to the tool axis III, and the various tools 10, 11, and 12 are adjustable in the required succession in such a manner that their axes intersect alternatingly in one point along the illustrated axis III with the axes of rotation I and II. The rotation of the crosshead 9 for the positioning of the respective tools can be effected, for example, by means of an electric servomotor (not shown) which can be numerically controlled, just as the drive and feed of the individual tools, namely in conformance with the movements of the clamping device 2. The advance of the shank face miller 10 can furthermore be derived, for example by electrical means, from the length termination of the connector blank along the axis I of the through hole.

In a modification of the embodiment shown in FIG. 6, it is possible to dispose the machining unit 1 in a fixed manner and the clamping device 2 to be rotatably movable about the axis IV. Furthermore, it is possible to conduct, instead of a relative rotary motion between the machining unit 1 and the clamping device 2, a relative motion along a linear path.

Figure 7:
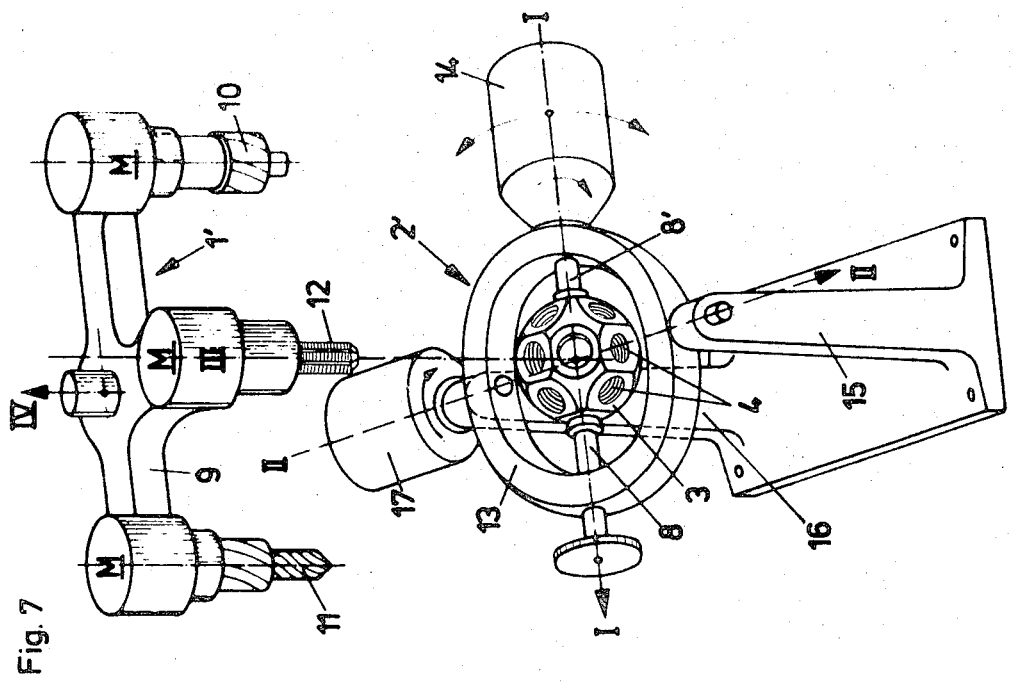
FIG. 7 is a schematic perspective view of another embodiment of a combined clamping device and machining unit for connectors.

In the embodiment shown in FIG. 7, the holding elements 8, 8' are mounted in a ring 13 to be rotatable and axially adjustable in such a manner that their axis of rotation I lies on a diameter of the ring. In this embodiment, the rotation of the holding elements 8, 8' and thus of the connector blank clamped therein about the axis I is caused by an electric servomotor 14 flanged to the ring 13. The ring 13, in turn, is suspended at bearing brackets 15, 16 so that it is rotatably movable about an axis of rotation II. An electric servomotor 17 flanged to the bearing bracket 16 effects the rotation of the ring 13 about the axis II. The arrangement of the axes I, II, III, and IV corresponds to that shown in FIG. 6.

For the continuous automatic manufacture of so-called standard connectors (as illustrated in FIGS. 2, 6, and 7) with a number of equally large threaded connecting bores and regular angles between the bores, as well as so-called special connectors i.e., connectors wherein the angles between the individual tapped holes can be different and wherein also the thread diameters can vary in the same connector from one tapped hole to the other, FIG. 8 shows schematically twelve clamping devices 20 of a construction as illustrated, for example, in FIG. 6 or in FIG. 7. These clamping devices are mounted at spacings from one another in an annular arrangement on an indexing table 21 rotatable about an axis IV. In the spacing of the clamping devices 20, ten machining units M1 – M10 are fixedly disposed in this embodiment on the periphery of the indexing table 21. The tool axes III of these machining units intersect the axis of rotation IV of the indexing table at a right angle. At a station 22, the connector blanks 24 fed at E are clamped and centered in a clamping device 20, while the finished connectors 25 are released from the individual clamping devices at station 23 and are discharged at A. The indexing table 21 is rotated intermittently, so that the machining units M1 through M10 can be simultaneously employed selectively, with the indexing table being at a standstill. The machining units are preferably designed for the largest applicable tapped connecting hole. It is also possible to fashion almost all, or only a few, of the machining units as multiple-spindle drilling heads for simultaneous drilling and thread cutting. In the normal case, the individual machining units M1 through M10 are each equipped with a specific tool. However, it is always possible to utilize the machining units simultaneously during standstill of the indexing table on the various connector blanks. The connector blanks are spatially adjustable in a single or multiple fashion in their clamping devices 20 at the respective work stations during standstill of the indexing table. The operating sequence generally also comprises in this instance — not considering the feeding and discharging of the connector blanks and finished connectors, respectively — the operations of centering, drilling, milling of the contact surfaces, and cutting of the thread. In case of large tapped connecting bores, it may be necessary to subdivide the drilling procedure in such a manner that first a preliminary drilling step is conducted with a smaller diameter and then the final tapping step is effected at a larger diameter. The subdivision of the drilling operation provides the additional advantage that two different machining units can be utilized for these partial operating sequences and thus the utilization of the entire apparatus is enhanced. The number of machining units and/or operating stations, by the way, depends on the number of differently large threaded connecting bores and additional partial operating steps, such as, for example, centering, milling of the contact surfaces, and preliminary drilling.

Advantageously, the device of FIG. 8 is under numerical control, in such a manner that a correct coordination is provided for the indexing steps of the indexing table from one machining unit and/or station to the next, as well as for the actuation and shutdown of the individual machining units and finally also for the adjusting motions of the clamping devices 20 for the connector blanks.

By means of such an apparatus, it is furthermore possible to conduct various programs for the manufacture of the connectors, without the necessity of separate installation and adjustment of special machining units for the different angles and thread diameters. When switching from one program to another, it is merely necessary to equip the individual machining units present in the apparatus with the required tools and to program the numerical control correspondingly. However, the machining units M1 through M10, rather than carrying multiple-spindle drilling heads, can also be provided with turret heads. In such a case it is possible, for example, to equip a turret head of one machining unit with tools for the centering, drilling, milling, and thread cutting operations. This means that, in the embodiment with ten machining units, a connector can be produced with ten tapped connecting bores wherein the thread diameters and angles differ from one bore to the next. The total manufacturing time for such special connectors is thereby reduced to an absolute minimum. The apparatus of FIG. 8 is consequently suitable for an economical mass production of connectors of a great variety of types. In this connection, one operator can advantageously operate, monitor, and centrally control simultaneously several ones of such apparatus.

In a deviation from the embodiment shown in FIG. 8, the machining units can also be fixedly disposed circularly above the path of motion of the clamping device, so that the axes III thereof extend in parallel or approximately in parallel to the axis of rotation IV of the indexing table 21.

FIG. 9 shows an embodiment of a multi-way clamping device 30 capable of receiving three connector blanks 3 for simultaneous processing in different, fixed positions in space. For this purpose, the apparatus comprises a bearing disk 32 mounted in a bearing block 31, as well as a ratchet wheel 33 to which a stub shaft 34 is attached, the latter being supported in a schematically indicated bearing block 35 which can be connected with the bearing block 31. The two disks 32, 33 are joined by an angle plate 36 serving as the support and are rotatable about the axis II by way of an electric servomotor 37 and a pinion 38. By such a rotation, the multiple-way clamping device can be placed, for example, into the different adjusting positions shown in FIG. 10 wherein the connector blanks assume correspondingly individual spatial positions.

The holding elements for the connector blanks 3 (only one being shown in FIG. 9) consist, in this embodiment, of a lower centering plug 39 and an upper centering plug 40, between which a connector blank can be clamped in the axis I of its through hole. In order to exchange the connectors, the upper plugs 40 are attached to arms 41 pivotably mounted in the angle plate 36; these arms can be operated, for example, by pneumatic or hydraulic devices which are not shown. The lower centering plugs 39 are rotatably mounted on axle stubs 42 aligned with the axes I/1, I/2, and I/3. The lower centering plugs are furthermore provided with a worm gear tooth system 43 meshing with a worm shaft 44 rotatably mounted in the disks 32, 33; this worm shaft, in turn, is rotatable by means of an electric servomotor 45 flanged to the bearing disk 32. Accordingly, by means of the servomotor 45, via the worm shaft 44 and the worm gears 43, all three connector blanks 3 can be simultaneously rotated about their axes I and placed in position. The axes I/1, I/2, and I/3 intersect the axis of rotation II in each case at a right angle, the points of intersection being congruent with the centers of the connector blanks.

A machining unit 46 is associated with the multiple-way clamping device 30; the tool axes III/1, III/2, and III/3 of this unit intersect in each case the individual axes I/1, I/2, and I/3 and the axis of rotation II in the individual, above-mentioned points. The machining unit 46 can be fashioned to be rotatable, similarly to the machining units 1 and 1' of FIGS. 6 and 7, respectively, and can contain a set of twist drills, shank face millers, and taps. The control of the multiple-way clamping device 30, the various drive means thereof, and the machining unit 46 can likewise be designed as a numerical control.

FIG. 11 shows an apparatus similar to that of FIG. 8, with an indexing table 21' rotatable about an axis IV, on which twelve multiple-way clamping devices 30' according to FIG. 9 are arranged in a circular manner and at equal spacings from one another. On the periphery of the indexing table 21', ten machining units M1' – M10' are fixedly disposed in such a manner that their tool axes III/1, III/2, and III/3 intersect the axes of rotation I and II of the individual clamping devices 39, 40 in individual points, as indicated in FIG. 9. The operating sequence in this apparatus corresponds to that described in connection with FIG. 8, except that, during standstill of the indexing table 21', simultaneously three connector blanks can be machined in their various fixed spatial positions on each machining unit M1' through M10'. A particularly economical mass production of standard connectors and special connectors is thereby made possible. The indexing table 21', the multiple-way clamping devices 30', and the machining units M1' through M10' are likewise controlled preferably in a numerical manner.

In a modification of the embodiments illustrated in FIGS. 8 and 11, the clamping devices can also be fixedly disposed and the machining units can be rotatably mounted on an annular support about the axis IV. In other words, the above-described relative motions are basically reversible, which also holds true for all movements about the various axes. According to the present invention, additional movements about further axes are possible in addition to the motions about the axes I through IV. Thus, in the embodiments according to FIGS. 8 and 11, the machining units can be rotated about the axis IV and additionally can be pivoted about further axes disposed in space in any desired manner.

I claim:
1. Apparatus for producing accurately spaced holes in spherical and polyhedral connector blanks having a through bore, comprising support means, a ring rotatably mounted on said support means for rotation about an axis (II), clamping means adapted to engage such connector blank at each end of the through bore along the longitudinal axis (I) thereof, said clamping means being rotatably supported on said ring and rotatable about the axis (I), a tool having a further axis (III) of rotation disposed perpendicular to the first-mentioned axis of rotation (II) of said ring, the two axes of rotation (I and II) of said ring and clamping means being disposed to intersect in a point with said further axis (III)

of said tool, whereby the connector blank may be oriented in space about its center to thereby permit machining of the connector blank over substantially its entire peripheral area without requiring rechucking thereof.

2. Apparatus according to claim 1, wherein the axis of rotation (I) of said clamping means is disposed on a diameter of said ring.

3. Apparatus according to claim 1, wherein motor means are connected to said clamping means and said ring means for rotating said clamping means about the axis (I) and the ring means about the axis (II).

4. Apparatus according to claim 1, wherein said tool is one of a plurality of tools included in a tool system associated with said clamping means, said tool system having an axis of rotation (IV) about which the plurality of tools are adjustable in such a manner that said further axis (III) of each tool alternatingly intersects the axes of rotation (I and II) of said ring and clamping means in one point, wherein the further axes (III) of said plurality of tools are arranged in parallel to the axis of rotation (IV) of the tool system.

* * * * *